(12) United States Patent
Dougherty (10) Patent No.: US 11,369,100 B2
(45) Date of Patent: Jun. 28, 2022

(54) ELECTRONIC BAIT BOX ASSEMBLY

(71) Applicant: Michael Dougherty, S Prairie, WA (US)

(72) Inventor: Michael Dougherty, S Prairie, WA (US)

( * ) Notice: Subject to any disclaimer, the term of this patent is extended or adjusted under 35 U.S.C. 154(b) by 114 days.

(21) Appl. No.: 16/777,436

(22) Filed: Jan. 30, 2020

(65) Prior Publication Data

US 2021/0235680 A1    Aug. 5, 2021

(51) Int. Cl.
| | | |
|---|---|---|
| *A01K 97/04* | (2006.01) | |
| *A01K 97/05* | (2006.01) | |
| *H05C 1/02* | (2006.01) | |
| *A01M 1/22* | (2006.01) | |

(52) U.S. Cl.
CPC .............. *A01K 97/04* (2013.01); *A01K 97/05* (2013.01); *A01M 1/22* (2013.01); *H05C 1/02* (2013.01)

(58) Field of Classification Search
CPC ........................................................ A01L 97/04
USPC ............................................................ 43/55
See application file for complete search history.

(56) References Cited

U.S. PATENT DOCUMENTS

| | | | | | |
|---|---|---|---|---|---|
| 1,932,237 | A | * | 10/1933 | Warner ................. | A01M 19/00 47/1.3 |
| 2,257,879 | A | * | 10/1941 | Graham ................ | A01K 97/04 43/55 |
| 2,328,993 | A | * | 9/1943 | Norling ................. | A01K 97/04 43/55 |
| 2,436,109 | A | * | 2/1948 | Kollman ................ | A01K 97/04 43/55 |
| 2,450,597 | A | * | 10/1948 | Karnowski ........... | A01M 29/24 47/1.3 |
| 2,466,447 | A | * | 4/1949 | Leighton ................ | A01K 97/04 43/55 |
| 2,507,319 | A | * | 5/1950 | Peters .................... | A01K 97/04 43/55 |
| 2,607,164 | A | * | 8/1952 | Fenton .................. | A01M 29/24 43/1 |
| 2,642,836 | A | * | 6/1953 | Brooks .................. | A01K 97/04 43/55 |
| 2,673,454 | A | * | 3/1954 | Gallie .................... | A01K 97/04 43/56 |
| 2,699,626 | A | * | 1/1955 | Bober .................... | A01K 97/04 43/55 |
| 2,770,075 | A | * | 11/1956 | Moore .................... | A01K 67/00 47/1.3 |
| 2,849,828 | A | * | 9/1958 | Johnson ................ | A01K 97/04 43/55 |

(Continued)

FOREIGN PATENT DOCUMENTS

| | | | | | |
|---|---|---|---|---|---|
| FR | 2845566 A1 | * | 4/2004 | ............ | A01K 97/04 |
| JP | 11206301 A | * | 8/1999 | | |

*Primary Examiner* — Darren W Ark (57) ABSTRACT

An electronic bait box assembly for storing earthworms includes a box for containing earth and earthworms. A lid is removably attached to the box for closing the box. A voltage unit is coupled to the bait box and the voltage unit is in electrical communication with an interior of the box. Moreover, the voltage unit is placed in electrical communication with the earth that is positioned in the box. The voltage unit induces an electrical voltage through the earth when the voltage unit is turned on. In this way the voltage unit urges the earthworms to move upwardly in the earth thereby facilitating a user to remove the earthworms for fishing bait.

6 Claims, 7 Drawing Sheets

(56) References Cited

U.S. PATENT DOCUMENTS

| | | | | |
|---|---|---|---|---|
| 2,885,819 A * | 5/1959 | Newell | A01K 97/04 | 43/55 |
| 2,903,814 A * | 9/1959 | Greer | A01K 97/04 | 43/55 |
| 3,006,106 A * | 10/1961 | Shuler | A01K 97/04 | 43/55 |
| 3,193,966 A * | 7/1965 | Lawson | A01K 97/04 | 43/55 |
| 3,423,869 A * | 1/1969 | Duerst | A01K 97/04 | 43/55 |
| 3,517,453 A * | 6/1970 | De Croes | A01K 97/04 | 43/55 |
| 3,566,836 A * | 3/1971 | Elfert | A01K 97/04 | 119/6.7 |
| 3,763,593 A * | 10/1973 | Guthrie | A01M 29/24 | 47/1.3 |
| 3,793,770 A * | 2/1974 | Johnson | A01M 17/00 | 47/1.3 |
| 3,820,279 A * | 6/1974 | Sieper | A01M 29/24 | 47/1.3 |
| 3,898,756 A * | 8/1975 | Tolle | A01M 29/24 | 43/21.2 |
| 3,964,204 A * | 6/1976 | McKinley | A01K 97/04 | 43/55 |
| 3,973,354 A * | 8/1976 | Schommer | A01M 19/00 | 47/1.3 |
| 4,015,176 A * | 3/1977 | Shanahan | A01M 23/38 | 361/232 |
| 4,800,666 A * | 1/1989 | Lukehart | A01K 97/04 | 43/4 |
| 4,817,331 A * | 4/1989 | Podsiadly | A01K 67/0332 | 43/1 |
| 4,882,872 A * | 11/1989 | Todd | A01K 97/04 | 43/55 |
| 4,896,452 A * | 1/1990 | Smith | A01K 97/05 | 43/17.1 |
| 4,936,043 A * | 6/1990 | Steele | A01K 97/05 | 43/55 |
| D320,504 S | 10/1991 | Mroezka | | |
| 5,481,823 A * | 1/1996 | Hoover | A01K 97/04 | 43/55 |
| 5,884,579 A * | 3/1999 | Slobodian | A01K 67/0332 | 119/6.7 |
| 9,131,670 B2 * | 9/2015 | Johnston | A01K 67/0332 | |
| 9,220,250 B1 * | 12/2015 | Davis, Sr. | A01K 97/05 | |
| 9,615,563 B2 * | 4/2017 | Fontaine | A01K 97/04 | |
| 2003/0005617 A1 * | 1/2003 | Holverson, Jr. | A01K 97/04 | 43/41 |
| 2010/0139566 A1 * | 6/2010 | Lopuszanski | B65D 81/26 | 119/6.7 |

* cited by examiner

ELECTRONIC BAIT BOX ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION (1) Field of the Invention

The disclosure relates to bait box devices and more particularly pertains to a new bait box device for storing earthworms.

(2) Description of Related Art including information disclosed under 37 CFR 1.97 and 1.98.

The prior art relates to bait box devices. The prior art discloses a bait box for storing earth and earthworms that includes a rotisserie for agitating the earth and earthworms to expose the earthworms. The prior art discloses a collapsible bait box comprising a plurality of panels being hingedly coupled together. The prior art discloses a variety of earthworm capturing devices that each includes at least one electrode that is insertable into earth and a power supply for supplying voltage to the electrode for urging earthworms out of the earth. Additionally, the prior art discloses a bait box that includes a moisturizing element for moisturizing earth in the bait box.

BRIEF SUMMARY OF THE INVENTION

An embodiment of the disclosure meets the needs presented above by generally comprising a box for containing earth and earthworms. A lid is removably attached to the box for closing the box. A voltage unit is coupled to the bait box and the voltage unit is in electrical communication with an interior of the box. Moreover, the voltage unit is placed in electrical communication with the earth that is positioned in the box. The voltage unit induces an electrical voltage through the earth when the voltage unit is turned on. In this way the voltage unit urges the earthworms to move upwardly in the earth thereby facilitating a user to remove the earthworms for fishing bait.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
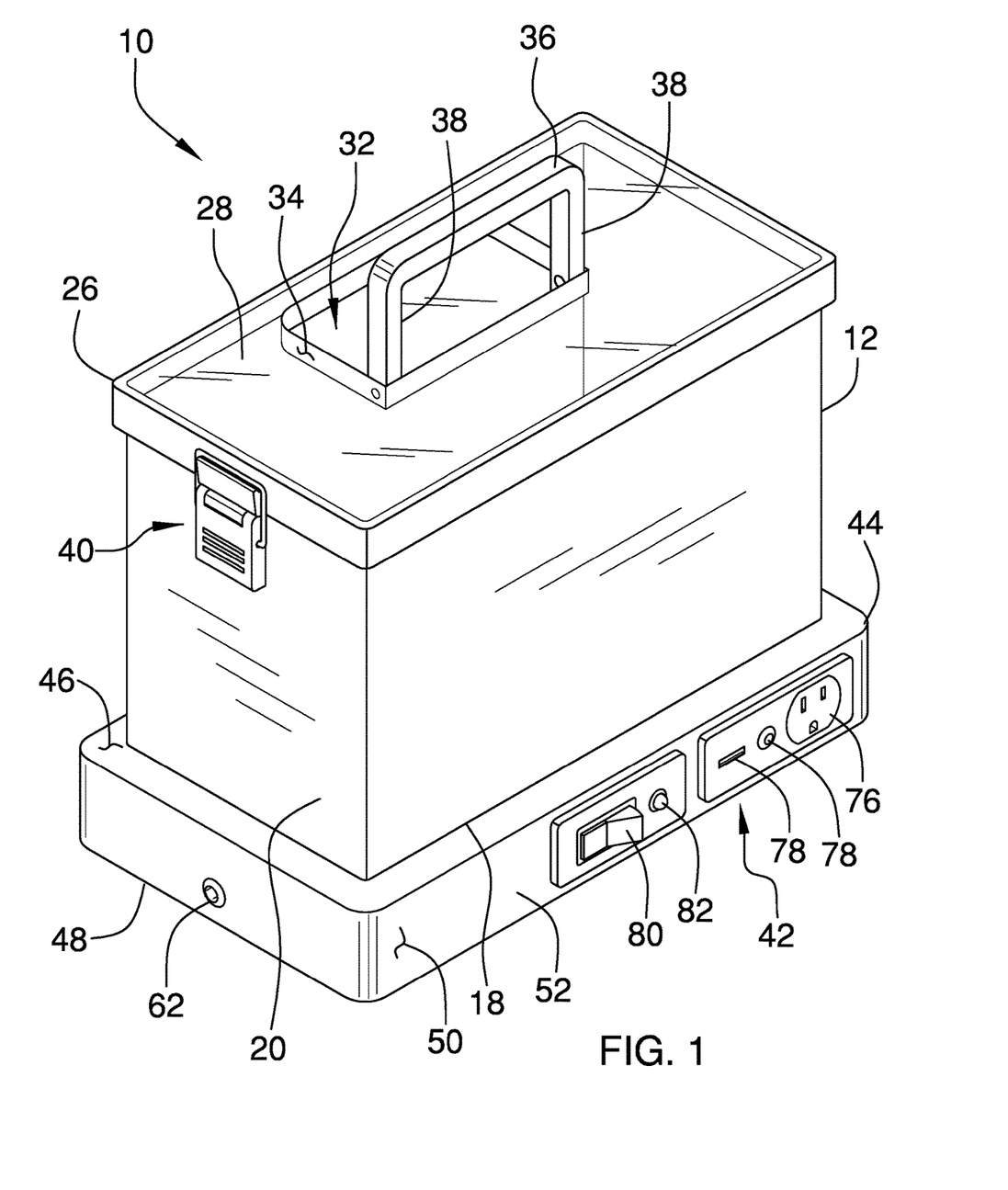
FIG. 1 is a perspective view of an electronic bait box assembly according to an embodiment of the disclosure.
Figure 2:
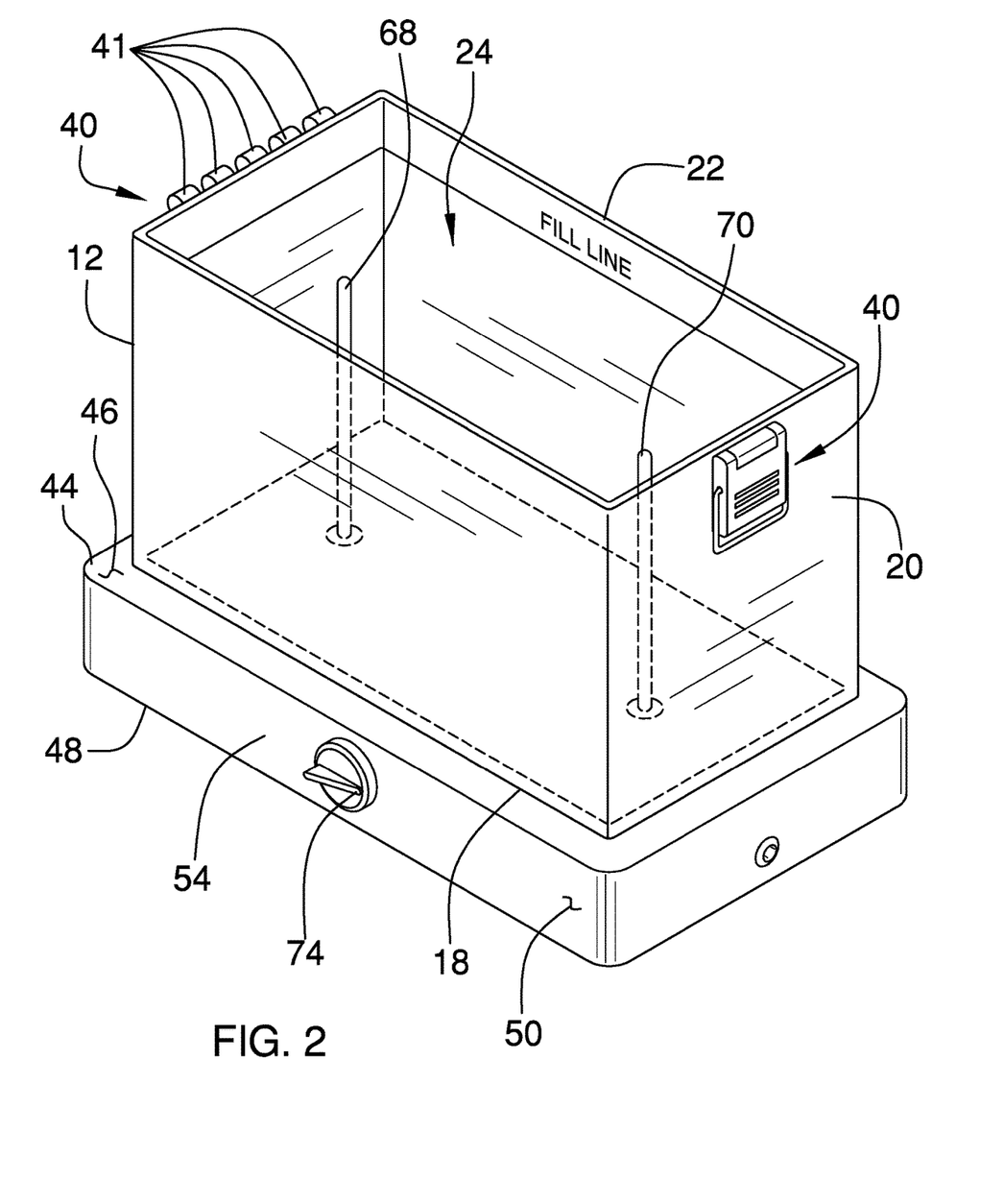
FIG. 2 is a top perspective view of an embodiment of the disclosure.
Figure 3:
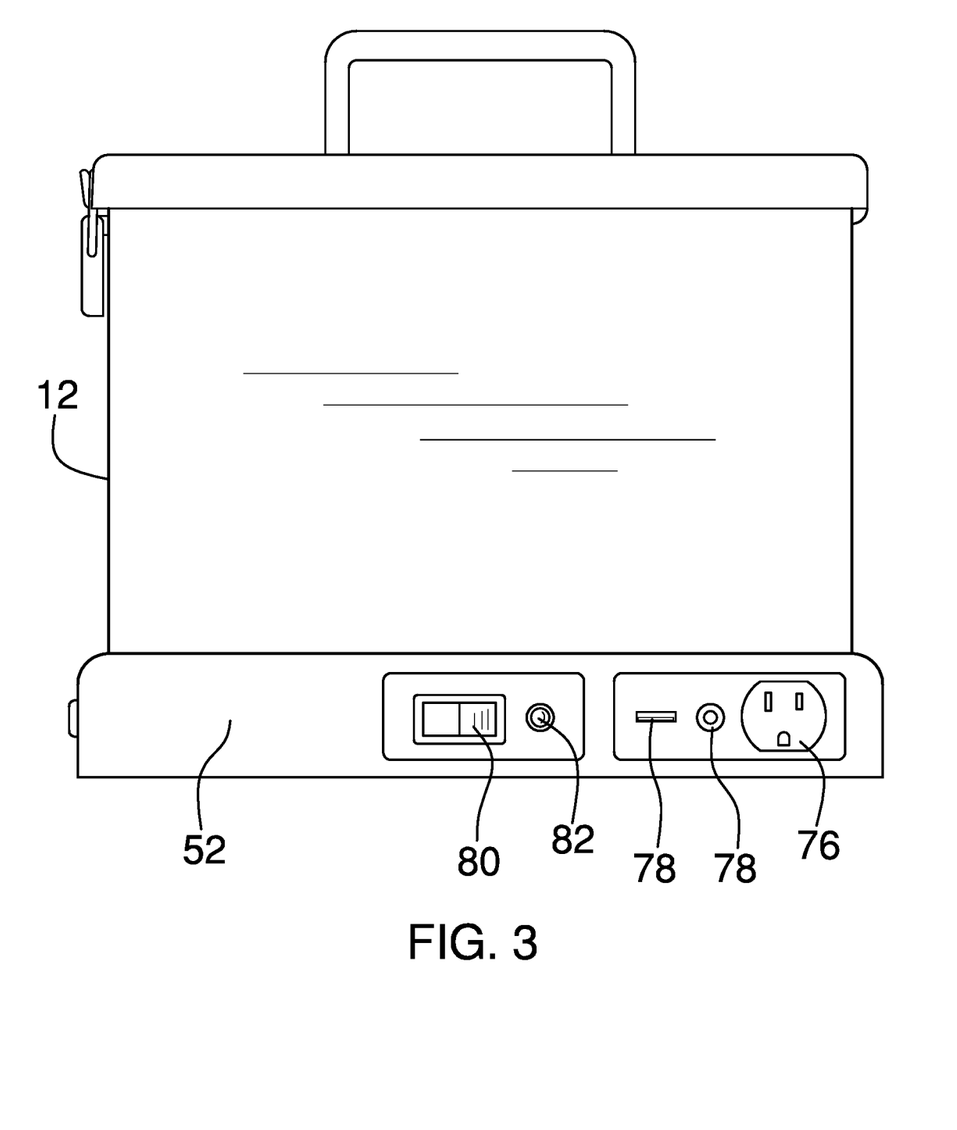
FIG. 3 is a front view of an embodiment of the disclosure.
Figure 4:
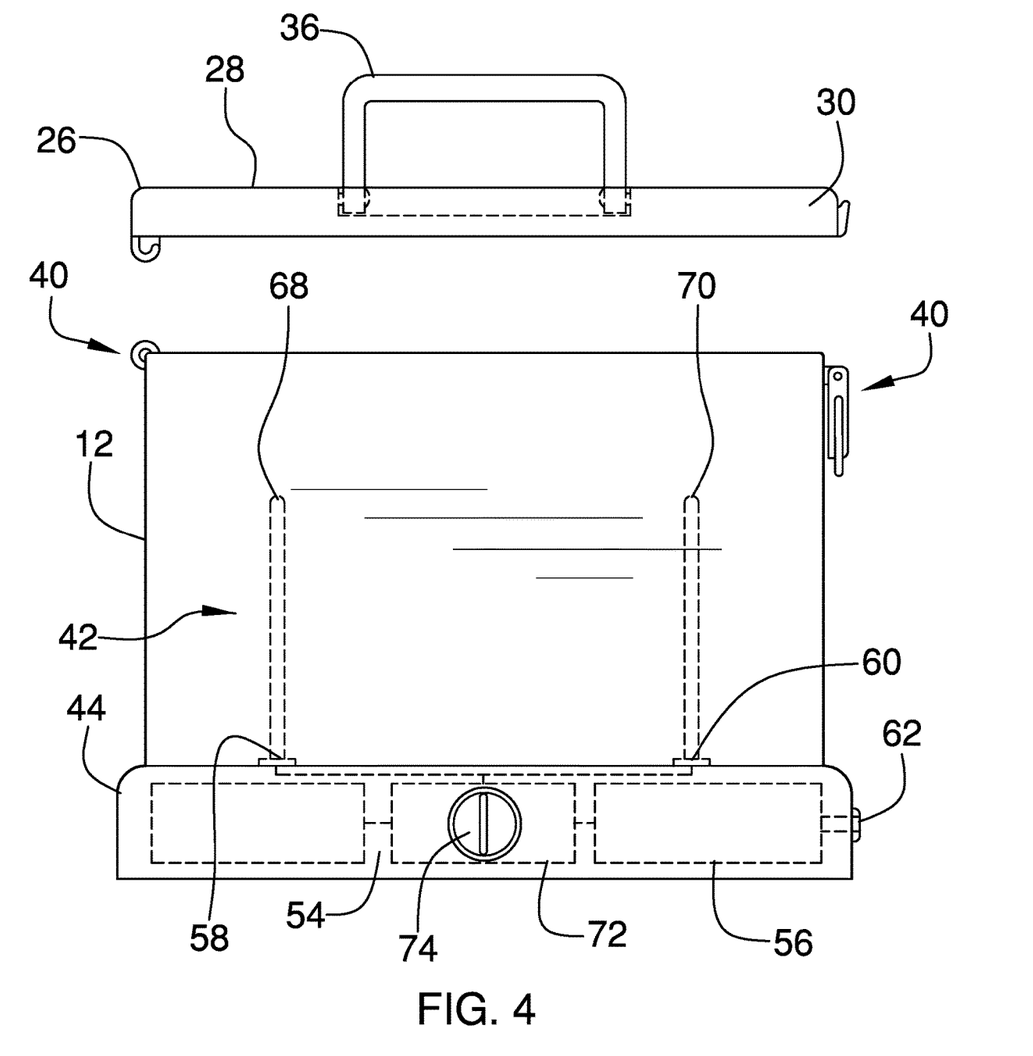
FIG. 4 is a back phantom view of an embodiment of the disclosure.
Figure 5:
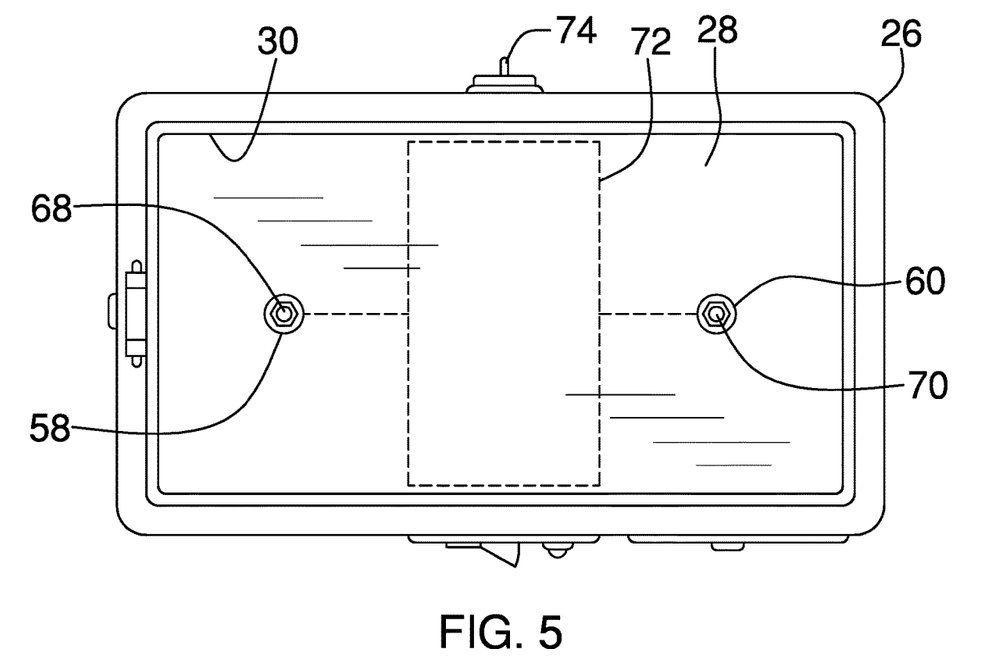
FIG. 5 is a top phantom view of an embodiment of the disclosure.
Figure 6:
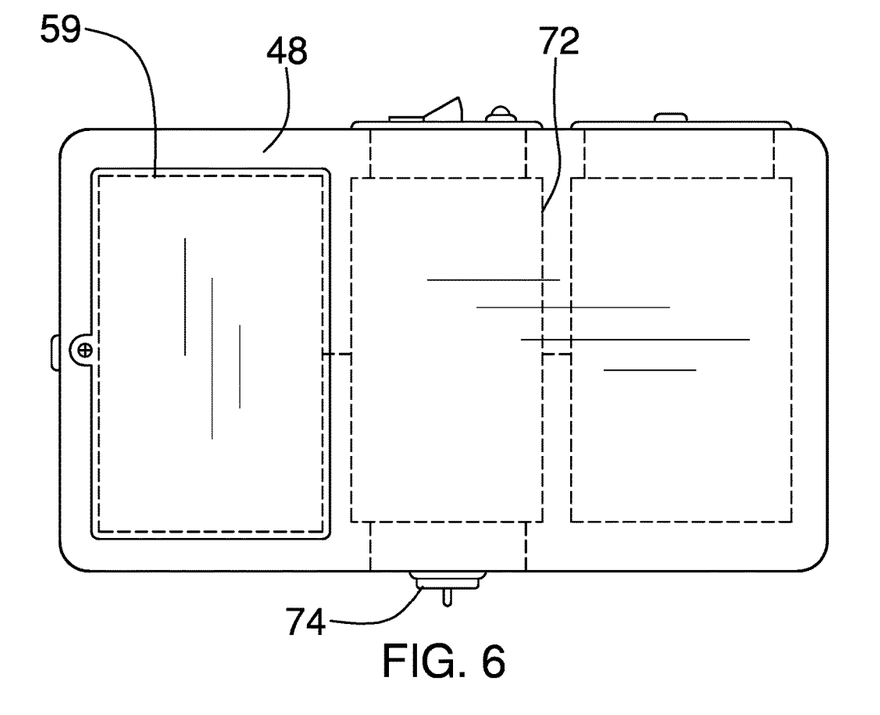
FIG. 6 is a bottom phantom view of an embodiment of the disclosure.
Figure 7:
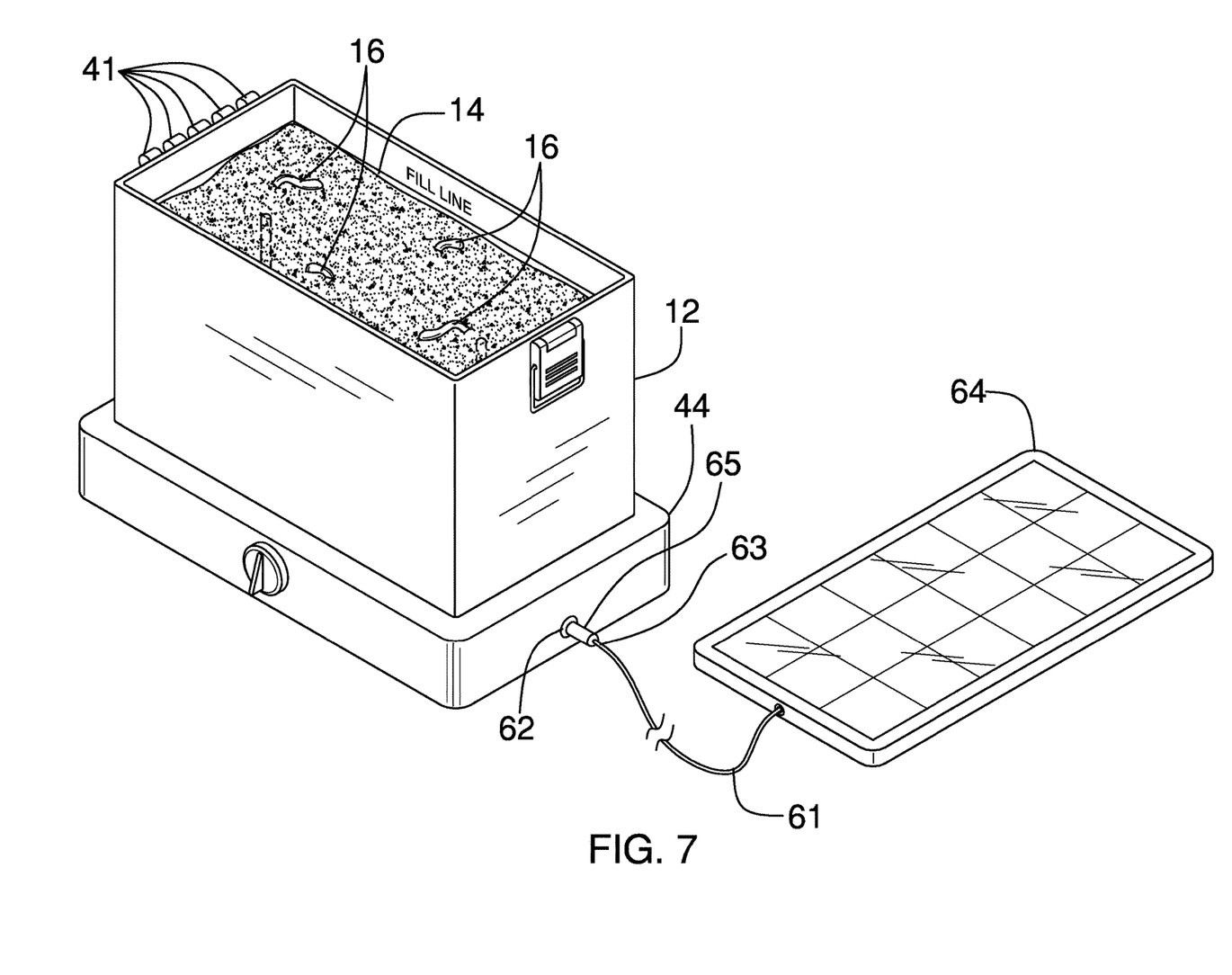
FIG. 7 is a perspective in-use view of an embodiment of the disclosure.
Figure 8:
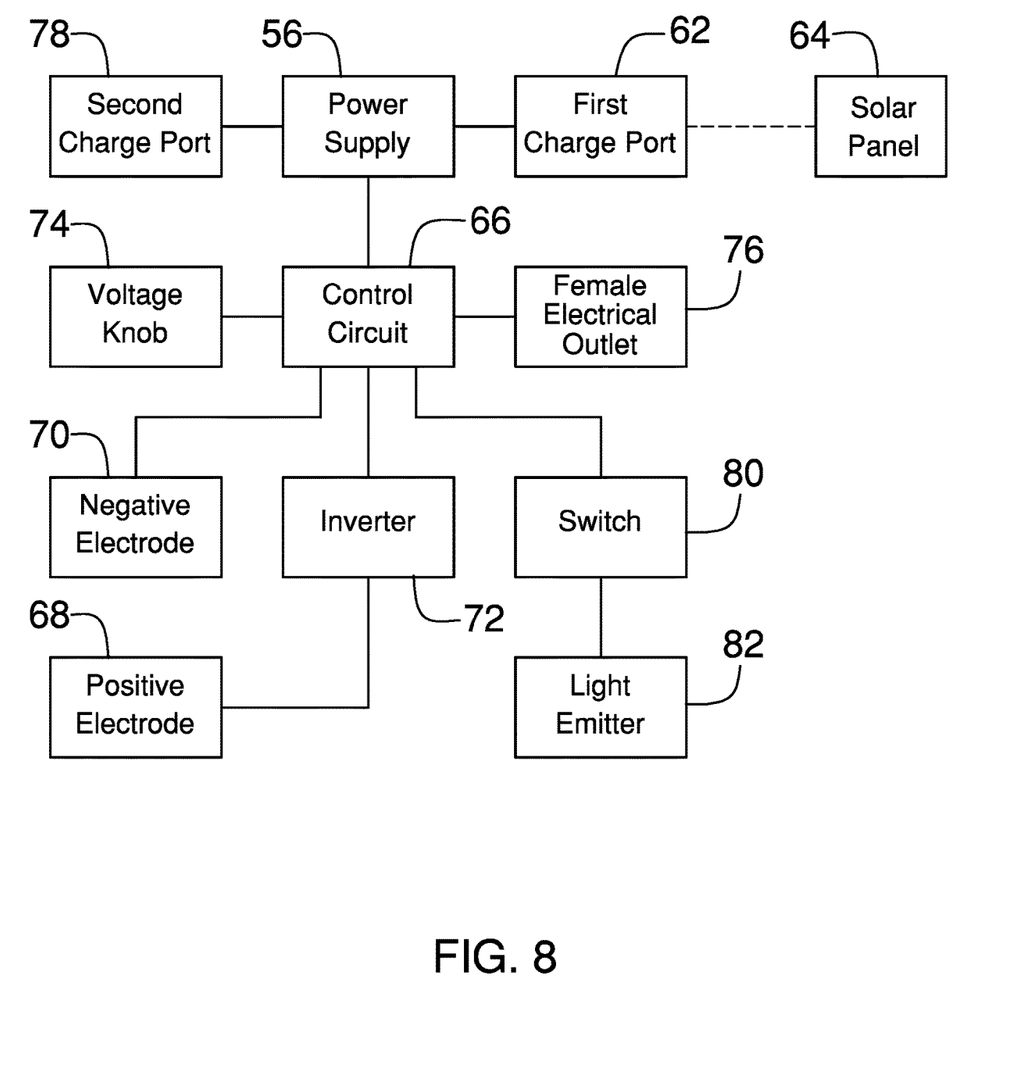
FIG. 8 is a schematic view of an embodiment of the disclosure.

With reference now to the drawings, and in particular to FIGS. 1 through 8 thereof, a new bait box device embodying the principles and concepts of an embodiment of the disclosure and generally designated by the reference numeral 10 will be described.

As best illustrated in FIGS. 1 through 8, the electronic bait box assembly 10 generally comprises a box 12 for containing earth 14 and earthworms 16. The box 12 has a bottom wall 18 and an outer wall 20, and the outer wall 20 has a distal edge 22 with respect to the bottom wall 18 to define an opening 24 into the box 12. A lid 26 is removably attached to the box 12 for closing the box 12. The lid 26 has top wall 28 and a lip 30 extending downwardly from a perimeter edge of the top wall 28. Additionally, the top wall 28 rests on the distal edge 22 of the outer wall 20 of the box 12 has the lip 30 extending downwardly along the outer wall 20. The top wall 28 has a recess 32 therein and the recess 32 has a bounding surface 34.

A handle 36 is pivotally coupled to the lid 26 for gripping. The handle 36 has a pair of legs 38 each pivotally engaging respective sides of the bounding surface 34 of the recess 32. The handle 36 is positioned in the recess 32 when the handle 36 is in a stored position. Conversely, the handle 36 extends upwardly from the recess 32 when the handle 36 is in a deployed position.

A pair of engagements 40 is each of movably coupled to the outer wall 20 of the box 12. Each of the engagements 40 releasably engages respective sides of the lip 30 on the lid 26 when the engagements 40 are positioned in a locked position and when the lid 26 is positioned on the box 12 for retaining the lid 26 on the box 12. Each of the engagements 40 disengages the respective side of the lip 30 when the engagements 40 are positioned in an unlocked position for removing the lid 26 from the box 12. Each of the engagements 40 may include a lever and a grapple that is movably coupled to the lever, a clamp, an elastomeric strap or any other type of releasable engagement. As is most clearly shown in FIGS. 2 and 7, one of the engagements 40 may comprise a plurality of hinges 41 that the lid hingedly engages.

A voltage unit 42 is provided and the voltage unit 42 is coupled to the bait box 12. The voltage unit 42 is in electrical communication with an interior of the box 12. In this way the voltage unit 42 is in electrical communication with the earth 14 that is positioned in the box 12. The voltage unit 42 induces an electrical voltage through the earth 14 when the voltage unit 42 is turned on. In this way the voltage unit 42 urges the earthworms 16 to move upwardly in the earth 14 thereby facilitating a user to remove the earthworms 16 for fishing bait without having to dig in the earth 14 for the earthworms 16.

The voltage unit 42 comprises a base 44 that has a top surface 46, a bottom surface 48 and a perimeter surface 50 extending therebetween. The perimeter surface 50 has a front side 52 and a back side 54, and the bottom wall 18 of the box 12 is coupled to the top surface 46 of the base 44. The voltage unit 42 includes a power supply 56 that is positioned within the base 44, and the power supply 56 has a positive contact 58 and a negative contact 60. A battery cover 59 is removably coupled to the bottom surface 48 of the base 44 and the power supply 56 is positioned behind the battery cover 59.

The voltage unit 42 includes a first charge port 62 that is recessed into the perimeter surface 50 of the base 44 and the first charge port 62 is electrically coupled to the power supply 56. The power supply 56 may comprise a 12.0 VDC battery or the like. A solar panel 64 is provided that has an output cord 61 electrically coupled thereto. The output cord 61 has a distal end 63 and a plug 65 is electrically coupled to the distal end 63. The plug 65 electrically engages the first charge port 62 such that the solar panel 64 charges the power supply 56 when the solar panel 64 is exposed to sunlight.

The voltage unit 42 includes a control circuit 66 that is positioned in the base 44 and the control circuit 66 is electrically coupled to the power supply 56. A positive electrode 68 is electrically coupled to the positive contact 58. The positive electrode 68 extends upwardly through the top surface 46 of the base 44 and the bottom wall 18 of the box 12. A negative electrode 70 is electrically coupled to the negative contact 60 and the negative electrode 70 extends upwardly through the top surface 46 of the base 44 and the bottom wall 18 of the box 12. The positive electrode 68 is electrically discrete from the negative electrode 70. Additionally, the positive electrode 68 is in electrical communication with the negative electrode 70 through the earth 14 when the earth 14 is placed in the box 12.

The voltage unit 42 includes an inverter 72 that is positioned in the base 44. The inverter 72 is electrically coupled to the positive contact 58 of the power supply 56. Additionally, the inverter 72 converts DC voltage from the power supply 56 into AC voltage to be delivered into the positive electrode 68. The inverter 72 may be an electronic inverter of any conventional design.

A voltage knob 74 is rotatably coupled to the perimeter surface 50 of the base 44 and the voltage knob 74 is electrically coupled to the control circuit 66. The voltage knob 74 is positionable in an off position. The voltage knob 74 adjusts the output voltage of the power supply 56 between a minimum voltage and a maximum voltage when the voltage knob 74 is rotated into an on position. Moreover, the power supply 56 is turned on when the voltage knob 74 is rotated into the on position such that the positive electrode 68 and the negative electrode 70 induce an electrical current through the earth 14 for urging the earthworms 16 to move upwardly in the earth 14. The power supply 56 is turned off when the voltage knob 74 is positioned in the off position.

The voltage unit 42 includes a female electrical outlet 76 that is integrated into the perimeter surface 50 of the base 44. The female electrical outlet 76 is electrically coupled to the inverter 72 for receiving the AC voltage. In this way the female electrical outlet 76 can supply electrical current for an electronic device that requires AC voltage to operate.

A plurality of second charge ports 78 is each recessed into the perimeter surface 50 of the base 44. Each of the second charge ports 78 is electrically coupled to the power supply 56. Additionally, an electronic device can be plugged into each of the second charge ports 78 for charging. The plurality of second charge ports 78 may include a usb port, a charger socket or any other type of electronic port.

The voltage unit 42 includes a switch 80 that is movably coupled to the perimeter surface 50 of the base 44. The switch 80 is electrically coupled between the power supply 56 and each of the female electrical outlet 76 and the plurality of second charge ports 78. Additionally, the switch 80 turns each of the female electrical outlet 76 and the plurality of second charge ports 78 on and off. A light emitter 82 is coupled to the perimeter surface 50 of the base 44 and the light emitter 82 is electrically coupled to the control circuit 66. The light emitter 82 is turned on when the switch 80 is turned on to indicate to a user that the switch 80 is turned on. The light emitter 82 may comprise an LED or the like.

In use, the box 12 is substantially filled with the earth 14 and earthworms 16 are placed in the earth 14 to store the earthworms 16 as fishing bait. The voltage knob 74 is rotated into the on position in order to induce the voltage into the earth 14. The resulting voltage in the earth 14 urges the earthworms 16 to climb to the surface of the earth 14 in the box 12. In this way the earthworms 16 can be removed from the box 12 for fishing without having to dig the earthworms 16. Additionally, the female electrical outlet 76 and the second charge ports 78 can be employed for powering various electronic devices.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. An electronic bait box assembly being configured to contain earthworms and employ electrical current to drive the earthworms, said assembly comprising:
   a box for containing earth and earthworms, said box has a bottom wall and an outer wall, said outer wall having a distal edge with respect to said bottom wall to define an opening into said box;
   a lid being removably attached to said box for closing said box, said lid having a top wall and a lip extending downwardly from a perimeter edge of said top wall, said top wall resting on said distal edge of said outer wall of said box having said lip extending downwardly along said outer wall, said top wall having a recess therein, said recess having a bounding surface; and
   a voltage unit being coupled to said box, said voltage unit being in electrical communication with an interior of said box wherein said voltage unit is configured to be in electrical communication with the earth when the earth is positioned in said box, said voltage unit inducing an electrical voltage through the earth when said voltage unit is turned on wherein said voltage unit is configured to urge the earthworms to move upwardly in the earth thereby facilitating a user to remove the earthworms for fishing bait, wherein said voltage unit comprises a base having a top surface, a bottom surface and a perimeter surface extending therebetween, said perimeter surface having a front side and a back side, said top surface having said bottom wall of said box being coupled thereto, wherein said voltage unit includes a power supply being positioned within said base, said power supply having a positive contact and a negative contact, wherein said voltage unit includes:
      a control circuit being positioned in said base, said control circuit being electrically coupled to said power supply,
      a positive electrode being electrically coupled to said positive contact, said positive electrode extending upwardly through said top surface of said base and said bottom wall of said box,
      a negative electrode being electrically coupled to said negative contact, said negative electrode extending upwardly through said top surface of said base and said bottom wall of said box, said positive electrode being electrically discrete from said negative electrode, said positive electrode being in electrical communication with said negative electrode through the earth when the earth is placed in said box,
      an inverter being positioned in said base, said inverter being electrically coupled to said positive contact of said power supply, said inverter converting DC voltage from said power supply into AC voltage to be delivered into said positive electrode,
      a voltage knob being rotatably coupled to said perimeter surface of said base, said voltage knob being electrically coupled to said control circuit, said voltage knob being positionable in an off position, said voltage knob adjusting an output voltage of said power supply between a minimum voltage and a maximum voltage when said voltage knob is rotated into an on position, and
      a female electrical outlet being integrated into said perimeter surface of said base, said female electrical outlet being electrically coupled to said inverter for receiving the AC voltage wherein said female electrical outlet is configured to supply electrical current for an electronic device;
   a pair of engagements, each of said engagements being movably coupled to said outer wall of said box, each of said engagements releasably engaging respective sides of said lip on said lid when said engagements are positioned in a locked position and when said lid is positioned on said box for retaining said lid on said box, each of said engagements disengaging said respective side of said lip when said engagements are positioned in an unlocked position for removing said lid from said box; and
   wherein said power supply is turned on when said voltage knob is rotated into said on position such that said positive electrode and said negative electrode induce an electrical current through the earth for urging the earthworms to move upwardly in the earth, said power supply being turned off when said voltage knob is positioned in said off position.

2. The assembly according to claim 1, wherein said voltage unit includes:
   a first charge port being recessed into said perimeter surface of said base, said first charge port being electrically coupled to said power supply; and
   a solar panel having an output cord being electrically coupled thereto, said output cord having a distal end, said distal end having a plug being electrically coupled thereto, said plug electrically engaging said first charge port such that said solar panel charges said power supply when said solar panel is exposed to sunlight.

3. The assembly according to claim 1, further comprising a plurality of second charge ports, each of said second charge ports being recessed into said perimeter surface of said base, each of said second charge ports being electrically coupled to said power supply, each of said second charge ports being configured to have an electronic device plugged therein for charging.

4. The assembly according to claim 3, further comprising a switch being movably coupled to said perimeter surface of said base, said switch being electrically coupled between said power supply and each of said female electrical outlet and said plurality of second charge ports, said switch turning each of said female electrical outlet and said plurality of second charge ports on and off.

5. The assembly according to claim 4, further comprising a light emitter being coupled to said perimeter surface of said base, said light emitter being electrically coupled to said control circuit, said light emitter being turned on when said switch is turned on wherein said light emitter is configured to indicate to a user that said switch is turned on.

6. An electronic bait box assembly being configured to contain earthworms and employ electrical current to drive the earthworms, said assembly comprising:
   a box for containing earth and earthworms, said box having a bottom wall and an outer wall, said outer wall having a distal edge with respect to said bottom wall to define an opening into said box;
   a lid being removably attached to said box for closing said box, said lid having top wall and a lip extending downwardly from a perimeter edge of said top wall, said top wall resting on said distal edge of said outer wall of said box having said lip extending downwardly along said outer wall, said top wall having a recess therein, said recess having a bounding surface;
   a handle being pivotally coupled to said lid for gripping, said handle having a pair of legs each pivotally engaging respective sides of said bounding surface of said recess, said handle being positioned in said recess when said handle is in a stored position, said handle extending upwardly from said recess when said handle is in a deployed position;

a pair of engagements, each of said engagements being movably coupled to said outer wall of said box, each of said engagements releasably engaging respective sides of said lip on said lid when said engagements are positioned in a locked position and when said lid is positioned on said box for retaining said lid on said box, each of said engagements disengaging said respective side of said lip when said engagements are positioned in an unlocked position for removing said lid from said box; and a voltage unit being coupled to said bait box, said voltage unit being in electrical communication with an interior of said box wherein said voltage unit is configured to be in electrical communication with the earth when the earth is positioned in said box, said voltage unit inducing an electrical voltage through the earth when said voltage unit is turned on wherein said voltage unit is configured to urge the earthworms to move upwardly in the earth thereby facilitating a user to remove the earthworms for fishing bait, said voltage unit comprising:

a base having a top surface, a bottom surface and a perimeter surface extending therebetween, said perimeter surface having a front side and a back side, said top surface having said bottom wall of said box being coupled thereto;

a power supply being positioned within said base, said power supply having a positive contact and a negative contact;

a first charge port being recessed into said perimeter surface of said base, said first charge port being electrically coupled to said power supply;

a solar panel having an output cord being electrically coupled thereto, said output cord having a distal end, said distal end having a plug being electrically coupled thereto, said plug electrically engaging said first charge port such that said solar panel charges said power supply when said solar panel is exposed to sunlight;

a control circuit being positioned in said base, said control circuit being electrically coupled to said power supply;

a positive electrode being electrically coupled to said positive contact, said positive electrode extending upwardly through said top surface of said base and said bottom wall of said box;

a negative electrode being electrically coupled to said negative contact, said negative electrode extending upwardly through said top surface of said base and said bottom wall of said box, said positive electrode being electrically discrete from said negative electrode, said positive electrode being in electrical communication with said negative electrode through the earth when the earth is placed in said box;

an inverter being positioned in said base, said inverter being electrically coupled to said positive contact of said power supply, said inverter converting DC voltage from said power supply into AC voltage to be delivered into said positive electrode;

a voltage knob being rotatably coupled to said perimeter surface of said base, said voltage knob being electrically coupled to said control circuit, said voltage knob being positionable in an off position, said voltage knob adjusting an output voltage of said power supply between a minimum voltage and a maximum voltage when said voltage knob is rotated into an on position, said power supply being turned on when said voltage knob is rotated into said on position such that said positive electrode and said negative electrode induce an electrical current through the earth for urging the earthworms to move upwardly in the earth, said power supply being turned off when said voltage knob is positioned in said off position;

a female electrical outlet being integrated into said perimeter surface of said base, said female electrical outlet being electrically coupled to said inverter for receiving the AC voltage wherein said female electrical outlet is configured to supply electrical current for an electronic device;

a plurality of second charge ports, each of said second charge ports being recessed into said perimeter surface of said base, each of said second charge ports being electrically coupled to said power supply, each of said second charge ports being configured to have an electronic device plugged therein for charging;

a switch being movably coupled to said perimeter surface of said base, said switch being electrically coupled between said power supply and each of said female electrical outlet and said plurality of second charge ports, said switch turning each of said female electrical outlet and said plurality of second charge ports on and off; and a light emitter being coupled to said perimeter surface of said base, said light emitter being electrically coupled to said control circuit, said light emitter being turned on when said switch is turned on wherein said light emitter is configured to indicate to a user that said switch is turned on.

* * * * *